(12) United States Patent
Eguchi

(10) Patent No.: US 6,972,774 B2
(45) Date of Patent: Dec. 6, 2005

(54) IMAGE PROCESSING SYSTEM FOR INSERTING PLURALITY OF IMAGES INTO COMPOSITE AREA, AND MEDIUM

(75) Inventor: Harutaka Eguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 131 days.

(21) Appl. No.: 09/737,489

(22) Filed: Dec. 18, 2000

(65) Prior Publication Data

US 2001/0015729 A1    Aug. 23, 2001

(30) Foreign Application Priority Data

Feb. 21, 2000    (JP) ............................... 2000-043672

(51) Int. Cl.[7] ................................................ G09G 5/00
(52) U.S. Cl. .................................................. 345/629
(58) Field of Search ............................... 345/629, 634, 345/635, 55, 56, 419, 531, 540, 641, 790, 345/794, 555, 565, 420, 421, 422, 423, 424, 345/426, 427, 428, 619, 625, 628, 630, 638, 345/473, 474, 475; 715/790, 794

(56) References Cited

U.S. PATENT DOCUMENTS

| | | | | |
|---|---|---|---|---|
| 4,602,286 A | * | 7/1986 | Kellar et al. | 348/597 |
| 5,381,518 A | * | 1/1995 | Drebin et al. | 345/424 |
| 5,627,651 A | * | 5/1997 | Seto et al. | 358/3.15 |
| 5,636,334 A | * | 6/1997 | Hidaka | 345/419 |
| 5,732,230 A | * | 3/1998 | Cullen et al. | 345/764 |
| 5,819,103 A | * | 10/1998 | Endoh et al. | 710/1 |
| 5,861,888 A | * | 1/1999 | Dempsey | 345/582 |
| 5,977,965 A | * | 11/1999 | Davis et al. | 345/723 |
| 5,979,424 A | * | 11/1999 | Alvarez et al. | 124/16 |
| 5,982,350 A | * | 11/1999 | Hekmatpour et al. | 345/629 |
| 6,031,542 A | * | 2/2000 | Wittig | 345/426 |
| 6,137,498 A | * | 10/2000 | Silvers | 345/629 |
| 6,266,068 B1 | * | 7/2001 | Kang et al. | 345/629 |
| 6,268,935 B1 | * | 7/2001 | Kingetsu et al. | 358/2.1 |
| 6,323,876 B1 | * | 11/2001 | Rao et al. | 345/634 |
| 6,342,900 B1 | * | 1/2002 | Ejima et al. | 345/698 |
| 6,348,953 B1 | * | 2/2002 | Rybczynski | 348/584 |
| 6,417,848 B1 | * | 7/2002 | Battle | 345/419 |
| 6,469,701 B1 | * | 10/2002 | Gumhold | 345/419 |
| 6,480,199 B1 | * | 11/2002 | Oomori et al. | 345/536 |
| 6,496,189 B1 | * | 12/2002 | Yaron et al. | 345/428 |
| 6,590,586 B1 | * | 7/2003 | Swenton-Wall et al. | 345/730 |

* cited by examiner

*Primary Examiner*—Kee M. Tung
*Assistant Examiner*—Enrique L. Santiago
(74) *Attorney, Agent, or Firm*—Staas & Halsey LLP

(57) ABSTRACT

An image processing system according to the present invention aiming at providing a function capable of efficiently managing and utilizing image data, comprises a display unit for displaying on a screen a composite area as an aggregation of unit areas into which images are inserted, and an operation unit for inserting a processing target image into the unit area within the composite area.

20 Claims, 17 Drawing Sheets

FIG. 17

| BLOCK NUMBER | IMAGE MEMORY AREA HEAD ADDRESS | IMAGE MEMORY TERMINAL AREA ADDRESS | BLOCK LEFT DOWNWARD COORDINATES | BLOCK LEFT DOWNWARD COORDINATES | BLOCK RIGHT UPWARD COORDINATES | BLOCK RIGHT UPWARD COORDINATES |
|---|---|---|---|---|---|---|
| | | | XL | YL | XR | YR |
| B1 | Addr1 | Addr2 | XL1 | YL1 | XR1 | YR1 |
| B2 | Addr3 | Addr4 | XL2 | YL2 | XR2 | YR2 |
| : | : | : | : | : | : | : |
| Ba | Addra | Addrb | XLa | YLa | XRa | YRa |

IMAGE PROCESSING SYSTEM FOR INSERTING PLURALITY OF IMAGES INTO COMPOSITE AREA, AND MEDIUM

BACKGROUND OF THE INVENTION

1. Field of the Invention

The present invention relates to a technology of operating image data.

2. Description of the Related Art

What is exemplified as this type of conventional technology may be a technology of managing a plurality of images by laying out these images on a sheet as in the case of a photo album.

This technology is capable of laying out the images in any positions on the sheet. Further, according to this conventional technology, it is feasible to lay out the images so that they overlap with each other, and that the user may specify which target image appears as the first image when viewed, and which image is placed behind the first image where the images overlap. Further, the user may arbitrarily specify a different size for each image that is laid out.

According to this conventional technology, it is required that a system (software) manages positional data of the respective images laid out on the sheet, overlap data (front surface/rear surface) between the images, and size data of the images in order to actualize the function described above. A technique of managing the overlapped state between the images is generally known as a layer management.

On this type of sheet, when a new image is disposed on the sheet, or when a position of the image that has already been disposed on the sheet shifts, the respective images are re-respective image segments which should be displayed, from various items of management data stored.

Hence, this type of conventional technology requires a great quantity of resources for retaining a multiplicity of pieces of management data, and the process of re-forming each image is a load on the system (software). Therefore, a system having poor resources and a low throughput is insufficient for utilization of that technology.

On the other hand, with a development of the Internet and a spread of digital cameras, the image data have come to be dealt with in daily lives. Further, a mobile environment for portable terminals, cellular phones etc that are capable of operating the image data, has remarkably been developed. Under such a trend, it is much of importance to users who operate the images to efficiently manage and utilize the created image data etc. Particularly under the environment with poor resources for mobile equipment, a function of efficiently operating and editing the image data etc is also required.

The prior arts did not, however, provide such a function that the user is able to efficiently operate and edit the image data, such as combining and synthesizing the plurality of images into a new image. Moreover, there was not provided a function of efficiently managing and utilizing the images under the environment with the poor resources such as a memory and a disk capacity.

SUMMARY OF THE INVENTION

It is a primary object of the present invention, which was devised to obviate the above problems inherent in the prior arts, to provide such a function that a user can efficiently manage and utilize image data.

It is another object of the present invention to provide an image processing technology of processing a plurality of images, which can be sufficiently utilized in a system with a low throughput and poor resources.

To accomplish the above objects, according to one aspect of the present invention, an image processing system comprises a display unit for displaying, on a screen, a composite area as an aggregation of unit areas into which images are inserted, and an operation unit for inserting a processing target image into the unit area within the composite area.

The image inserted into the unit area may be transferable to other unit area within the composite area.

The image inserted into the unit area may be deleted by transferring the same image to a position outside the composite area.

The processing target image may be inserted into the unit area by a drag-and-drop operation.

The image processing system described above further comprise a transfer detection unit for indicating a processing target image and detecting a transfer of the indicated image, and the indicated image may be inserted into the unit area.

In the image processing system described above, the composite area into which the images are inserted may be stored as an image having predetermined dimensions. Herein, the image having the predetermined dimensions implies an image having a predetermined number of pixels.

The image processing system described above may further comprise a related image indicating module for relating a plurality of images to each other, and when the processing target image is related to other images, the related images may be consecutively inserted together with the processing target image into the plurality of unit areas. In this case, when the number of images to be inserted exceeds the number of insertable unit areas, the image insertion may be finished.

The composite area may be composed of the unit areas having different dimensions.

According to another aspect of the present invention, an image processing system comprises a plurality of unit storage areas for storing processing target images, and a control unit for controlling an access to each of the unit storage areas, and the control unit may store the processing target unit images in the plurality of unit storage areas, accesses the unit storage areas in a predetermined sequence, thereby generating a composite image from the unit images. In this case, the unit storage areas may have different capacities, and the composite image may be composed of the unit images having different dimensions.

According to a further aspect of the present invention, there is provided a readable-by-computer recording medium recorded with a program for making a computer actualize the function described above.

As explained above, according to the present invention, the image processing system comprises the display unit for displaying, on the screen, the composite area as the aggregation of unit areas into which the images are inserted, and the operation unit for inserting the processing target image into the unit area within the composite area. Further, a composite area in to which one or more images are inserted is stored as an image having predetermined dimensions. A user is therefore able to efficiently manage and utilize the image data.

BRIEF DESCRIPTION OF THE DRAWINGS

FIG. 17 is a chart showing an insert area management table.

DETAILED DESCRIPTION OF THE PREFERRED EMBODIMENT

Figure 1:
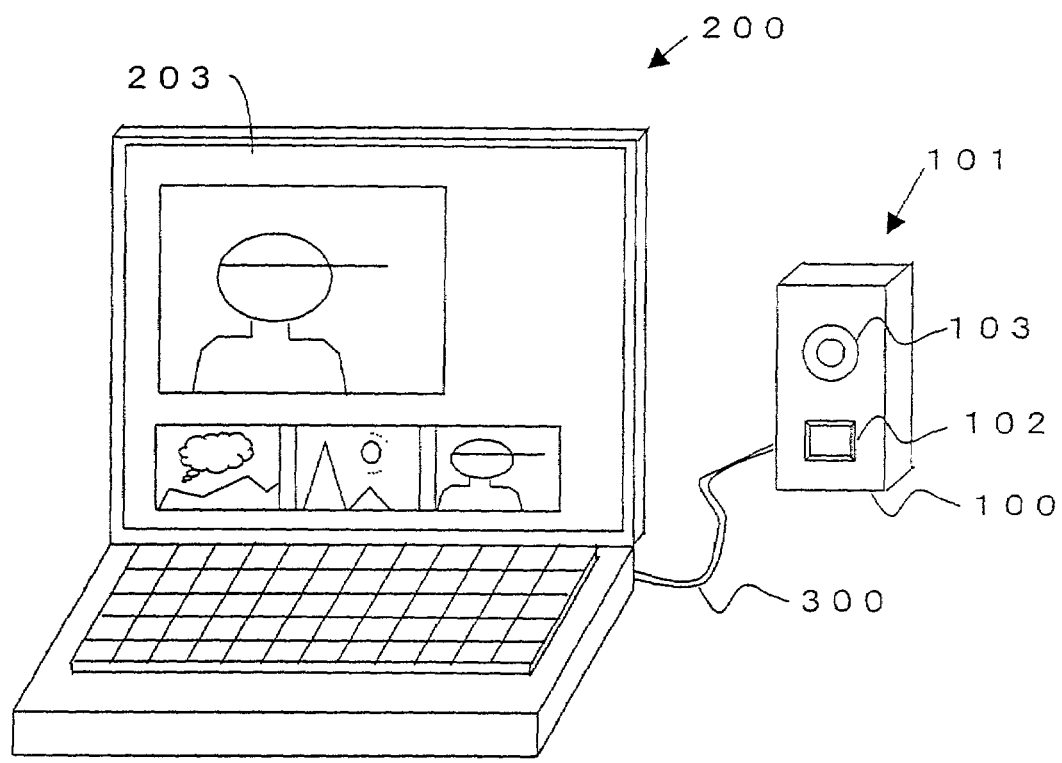
FIG. 1 is a view showing an external configuration of an image processing system in an embodiment of the present invention.
Figure 2:
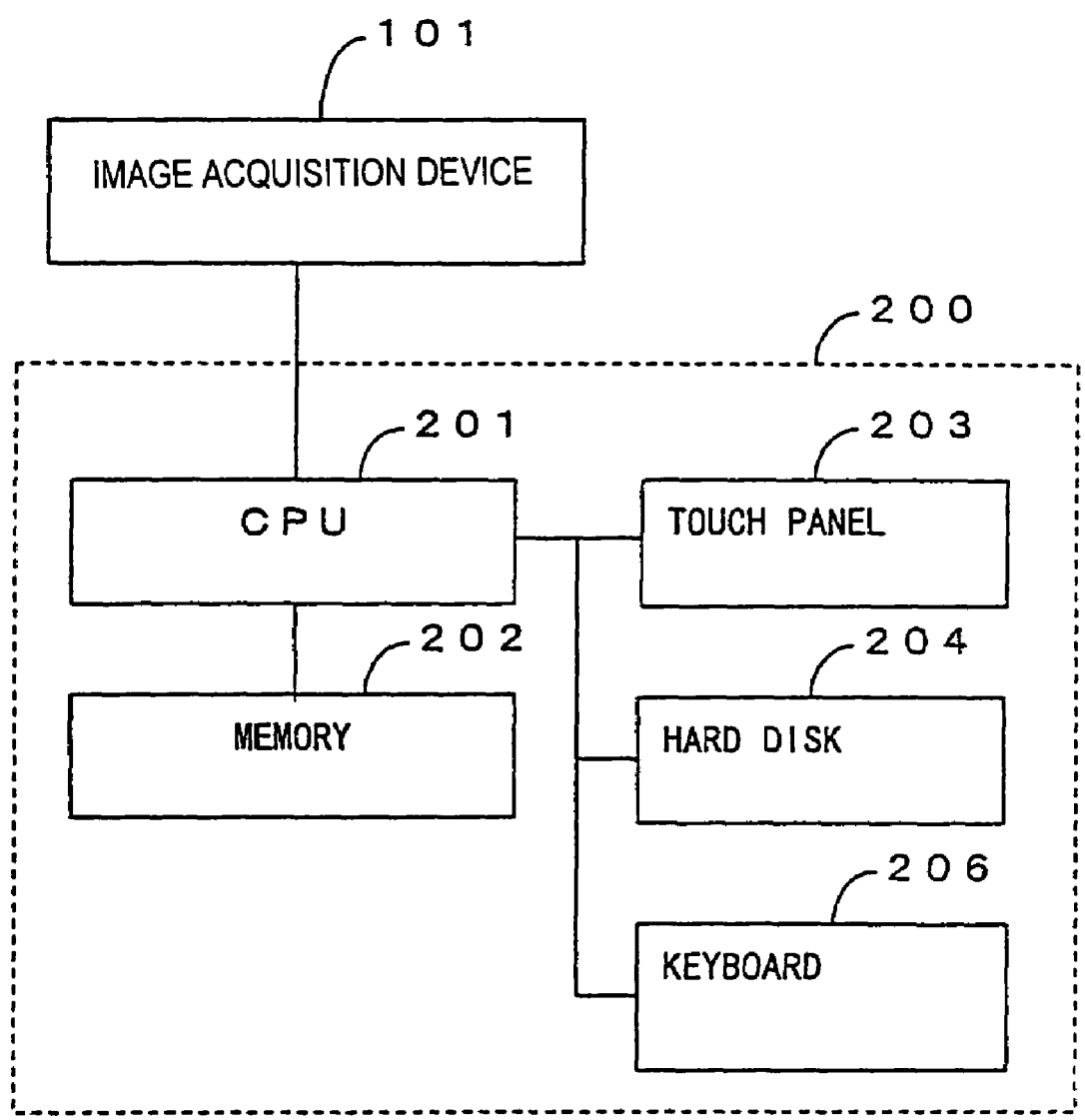
FIG. 2 is a block diagram showing a hardware architecture of the image processing system.
Figure 3:
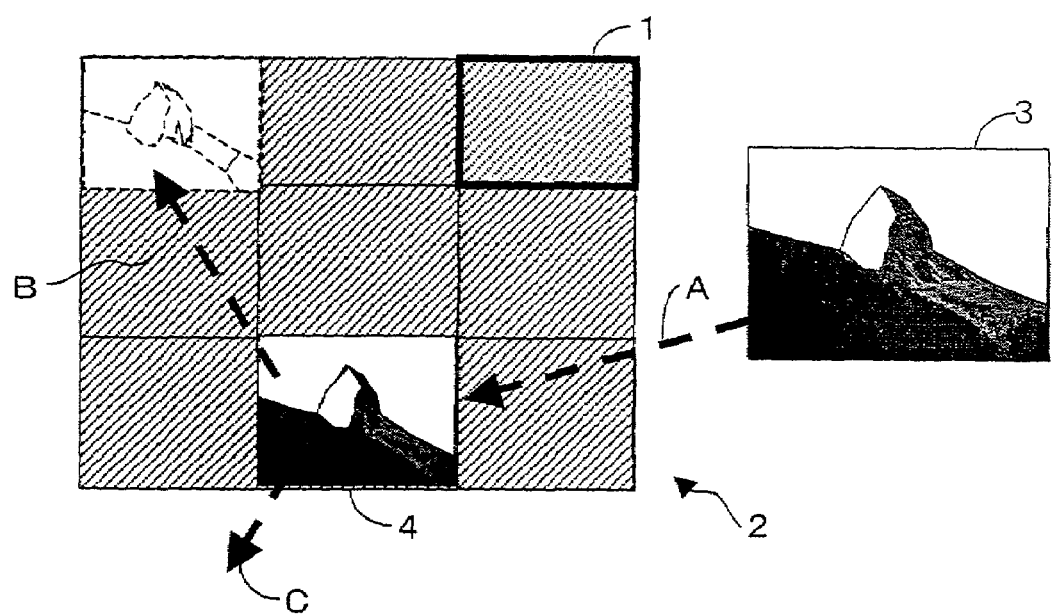
FIG. 3 is a view showing a principle of an image insert process.
Figure 4:
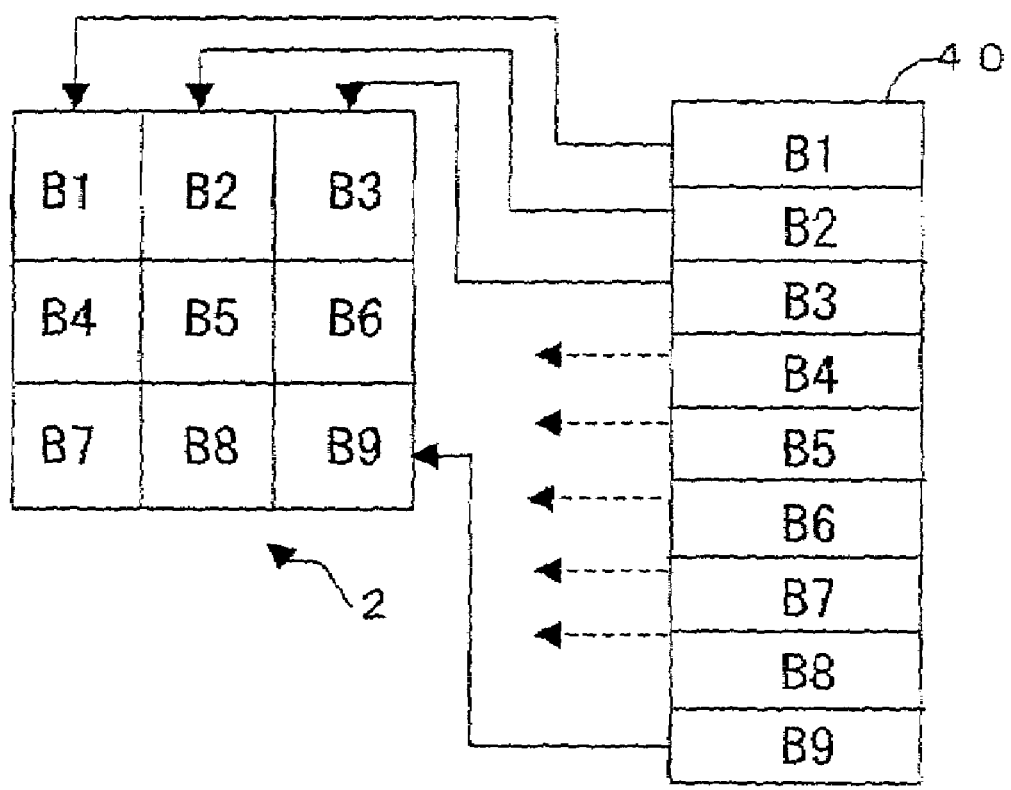
FIG. 4 is a diagram showing a memory map of an insert area.
Figure 5:
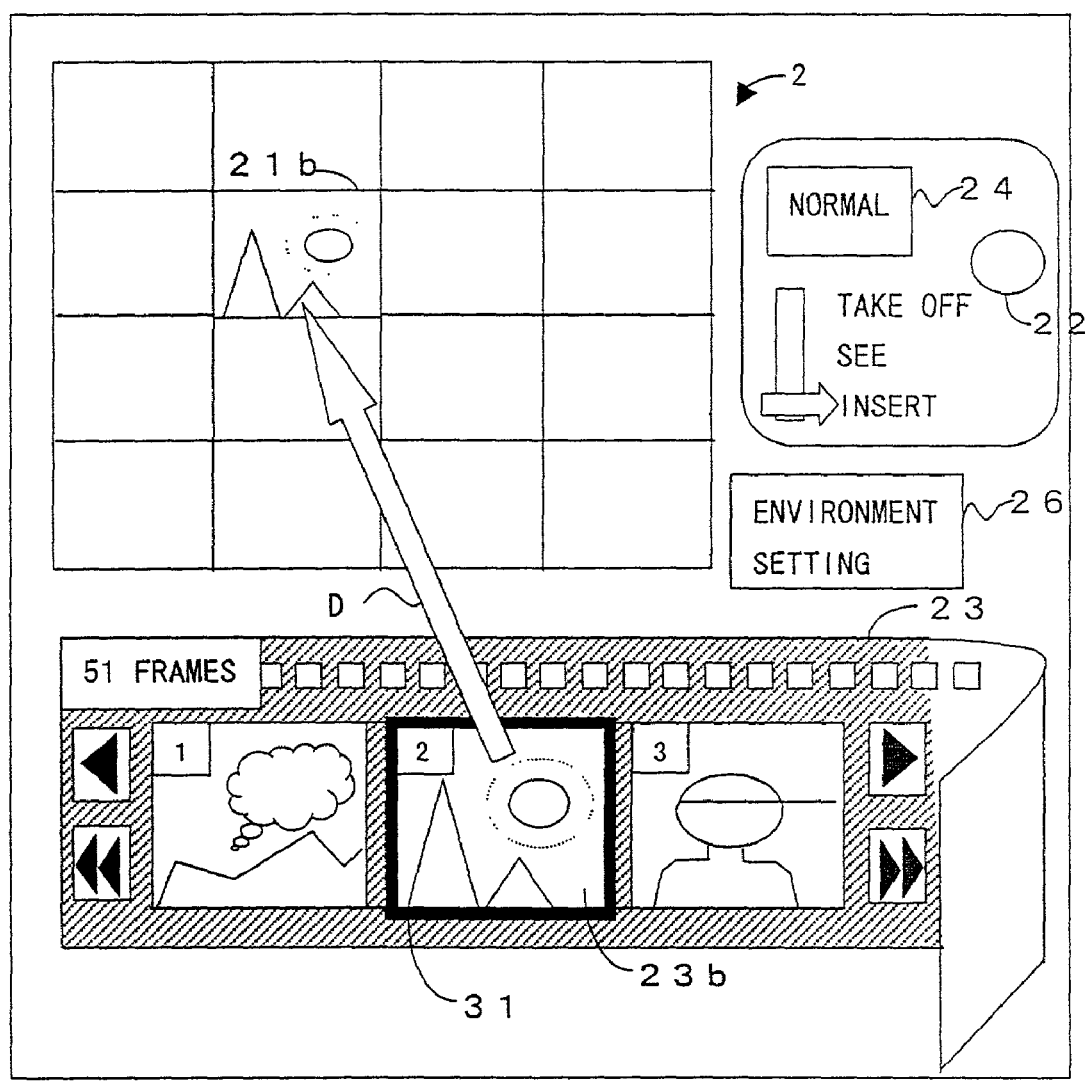
FIG. 5 is a view showing a typical image insert process.
Figure 6:
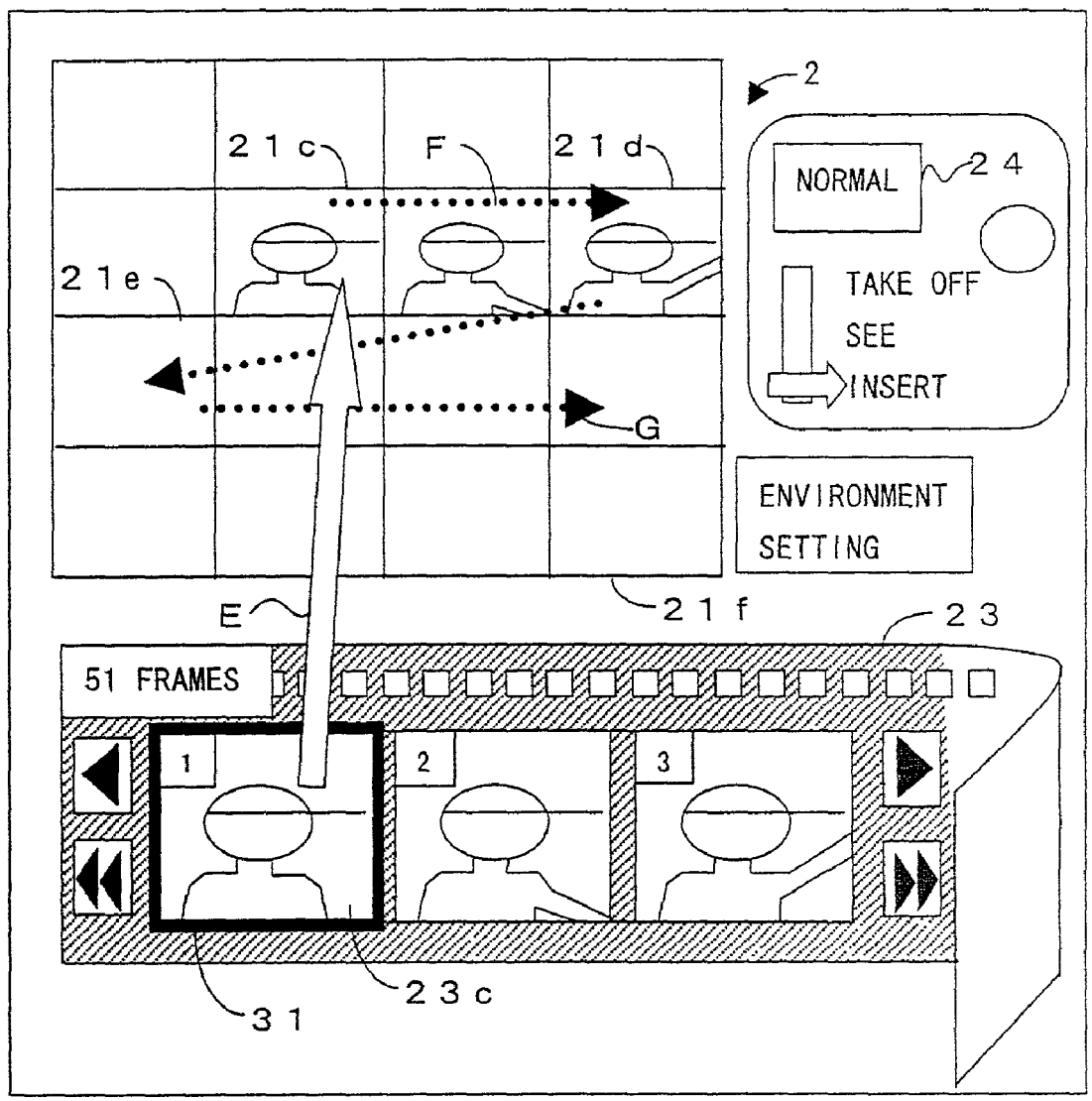
FIG. 6 is a view showing a consecutive image insert process.
Figure 7:
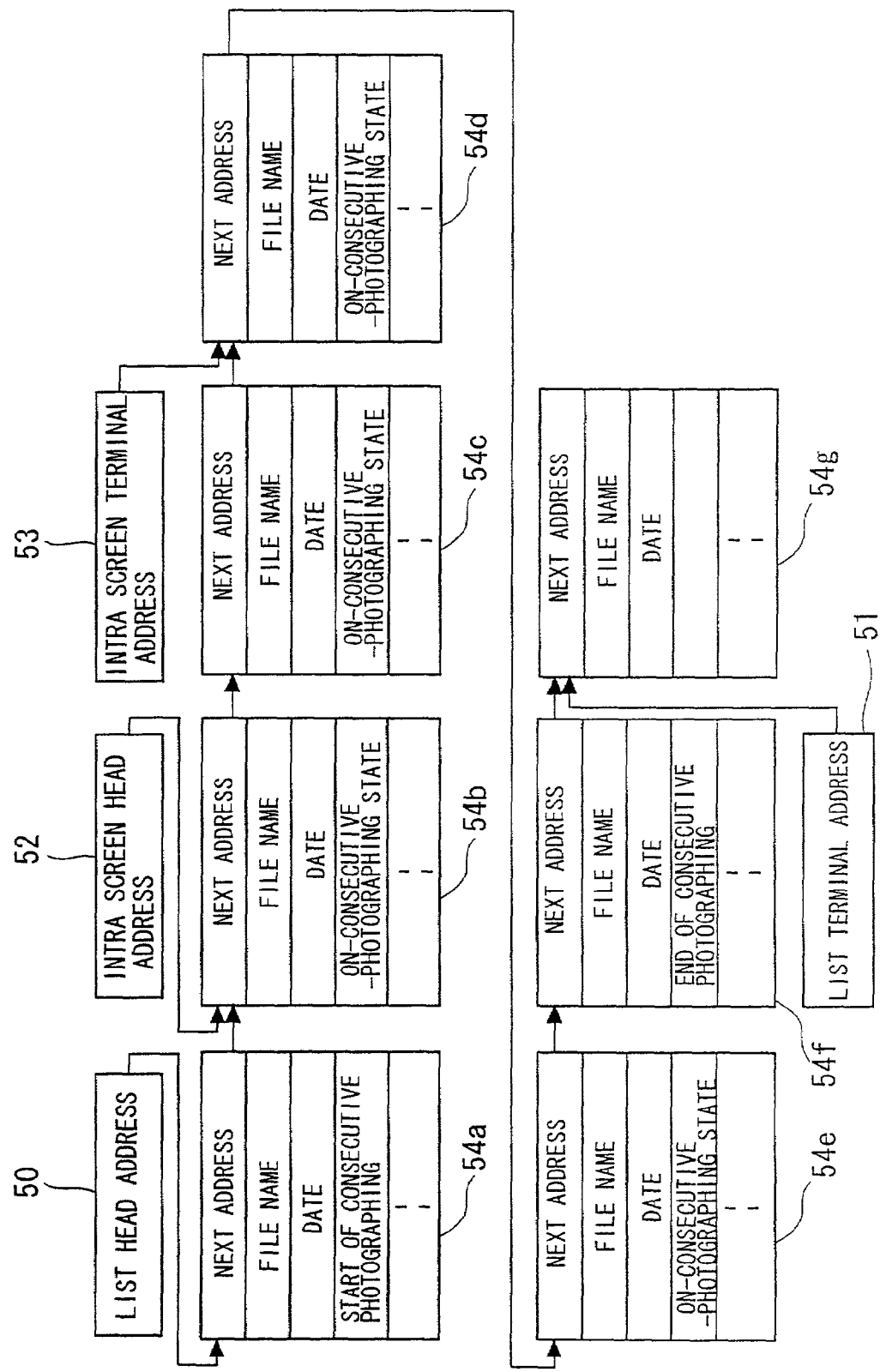
FIG. 7 is a diagram showing a data structure for an image data management.
Figure 8:
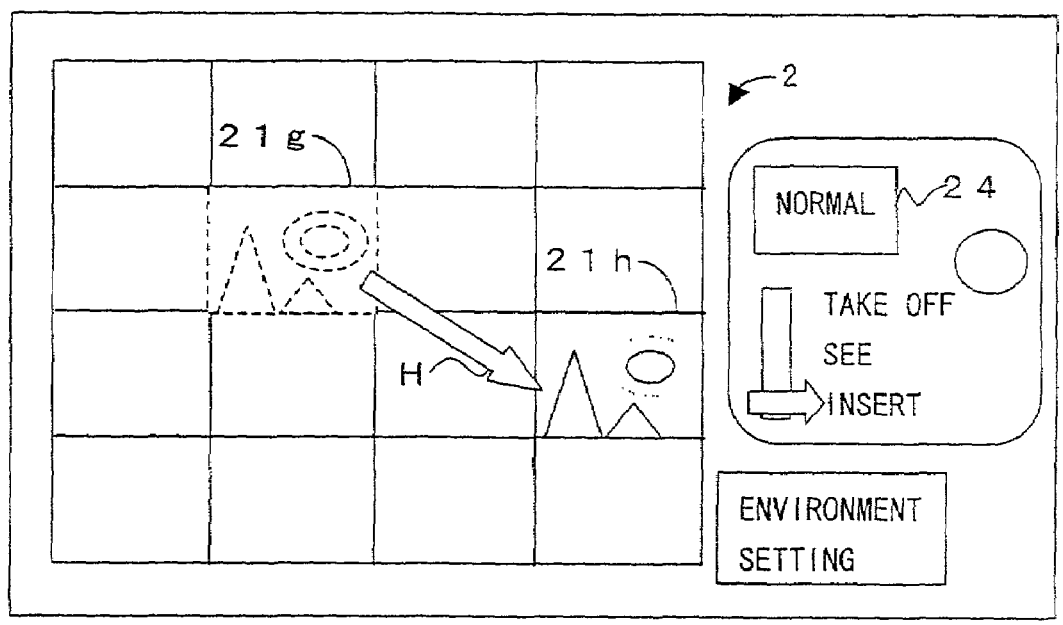
FIG. 8 is a view showing how the inserted image is transferred.
Figure 9:
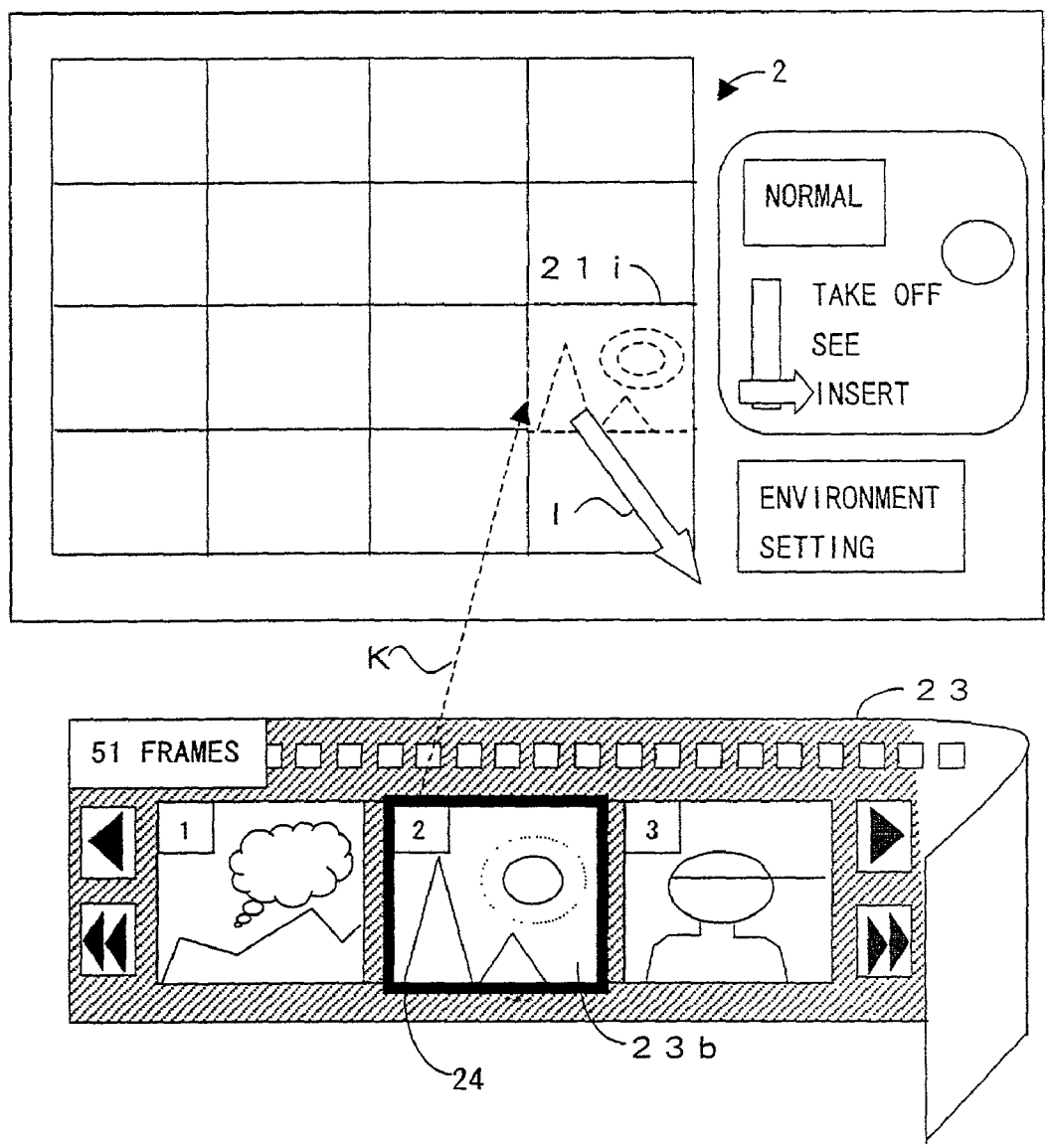
FIG. 9 is a view how the inserted image is deleted.
Figure 10:
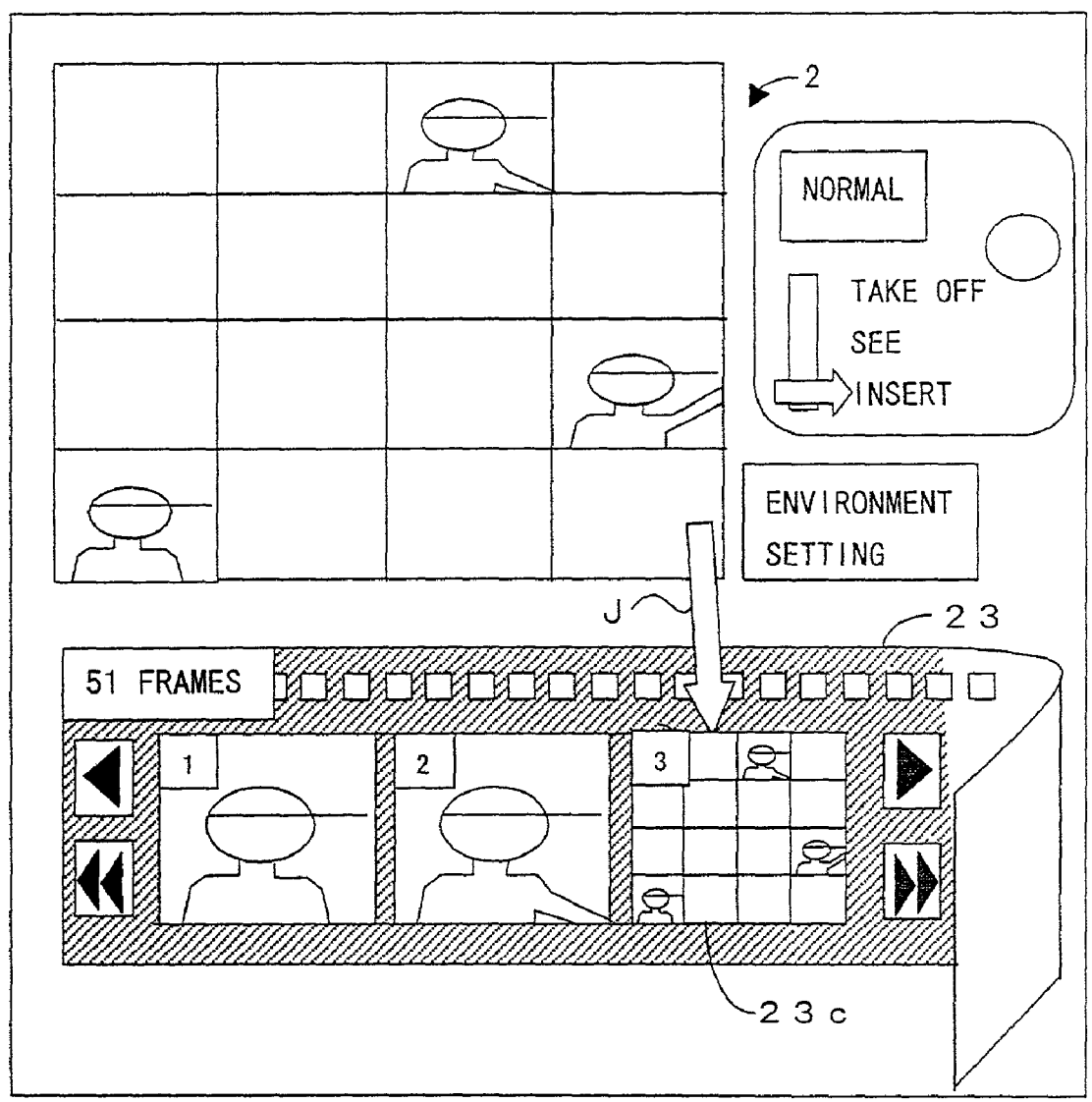
FIG. 10 is a view showing how the inserted image is stored.
Figure 11:
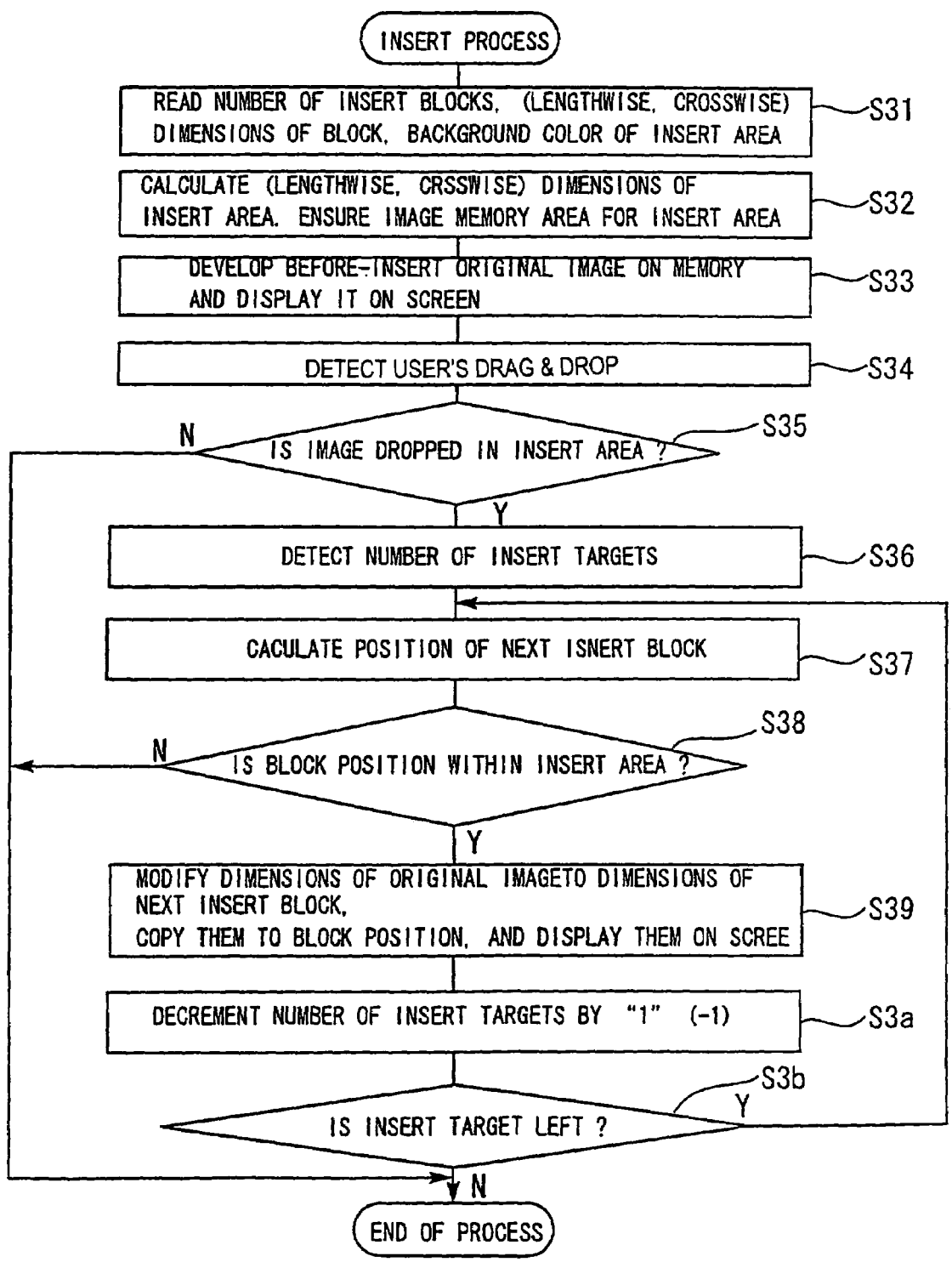
FIG. 11 is a flowchart showing the insert process.
Figure 12:
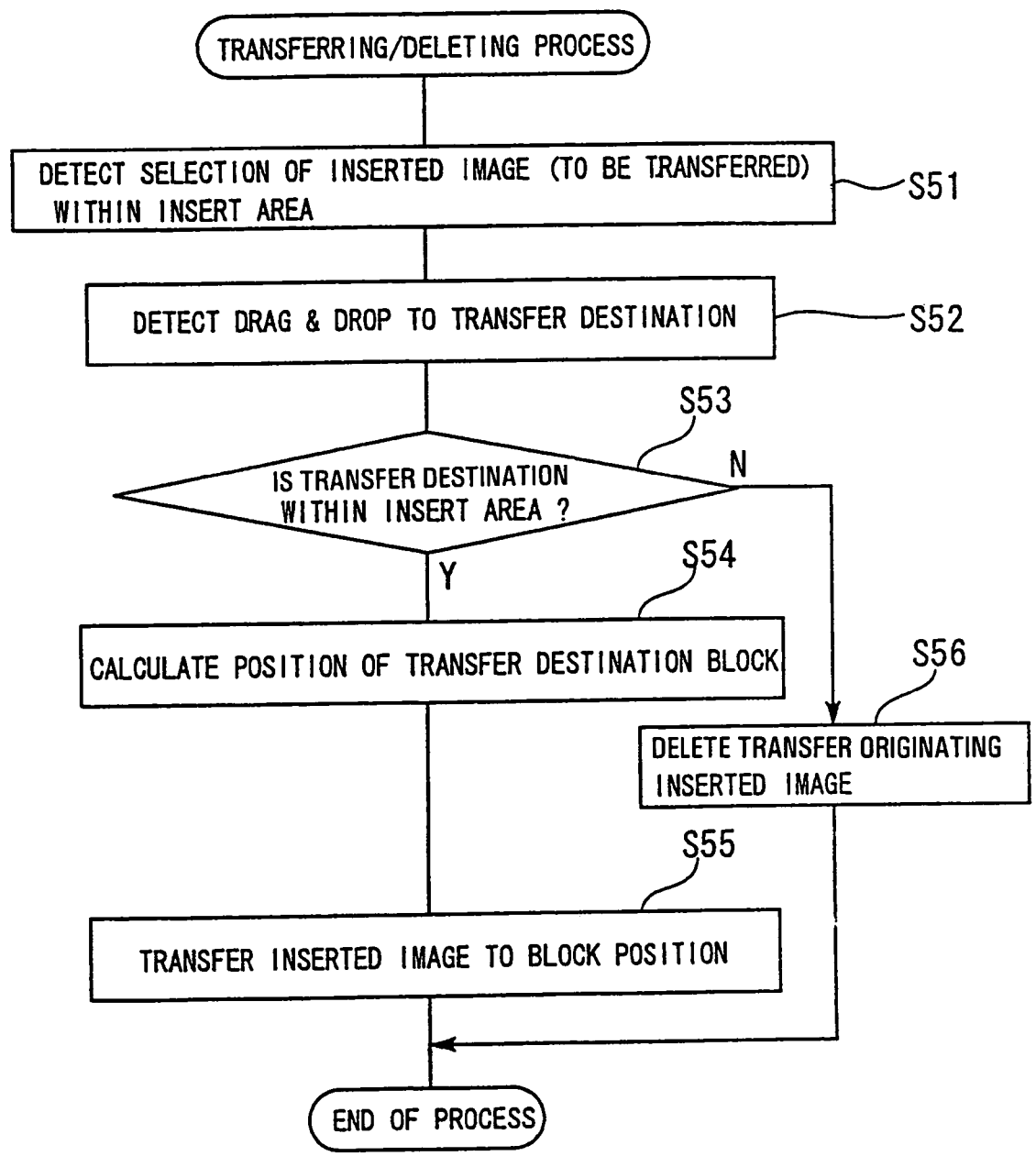
FIG. 12 is a flowchart showing an inserted image transferring/deleting process.
Figure 13:
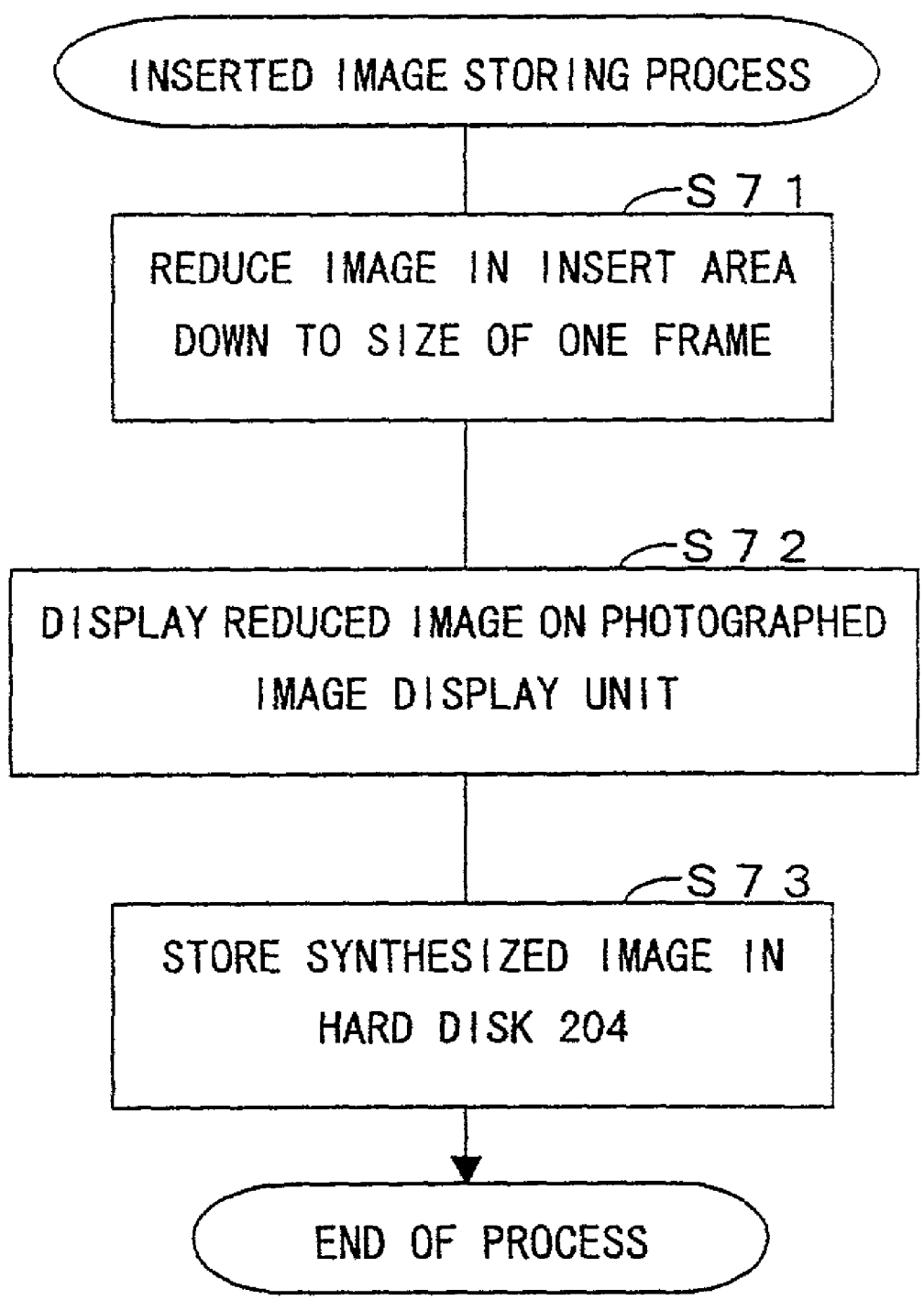
FIG. 13 is a flowchart showing an inserted image storing process.
Figure 14:
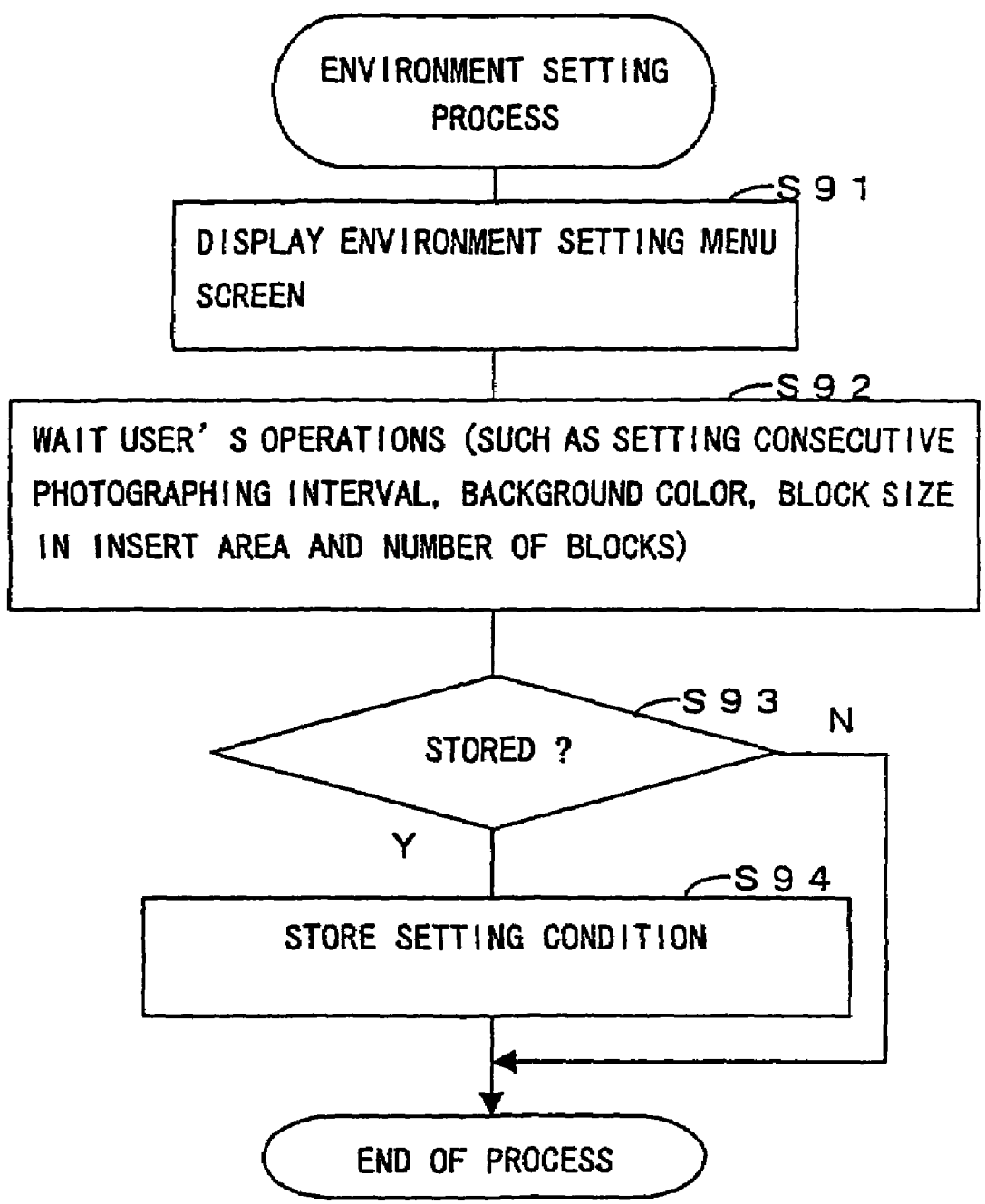
FIG. 14 is a flowchart showing an environment setting process.
Figure 15:
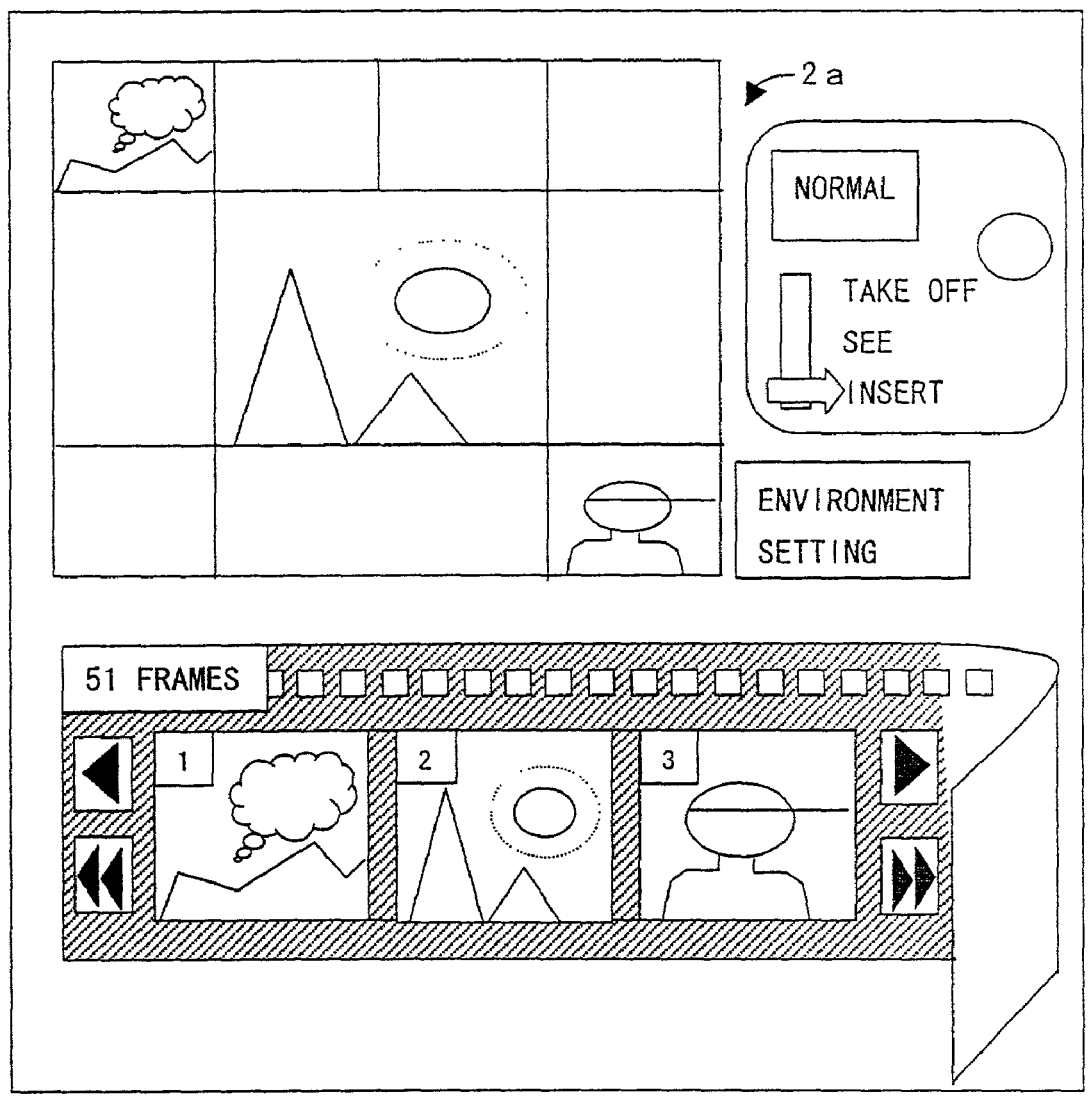
FIG. 15 is a view showing an example of a variation of the insert area.
Figure 16:
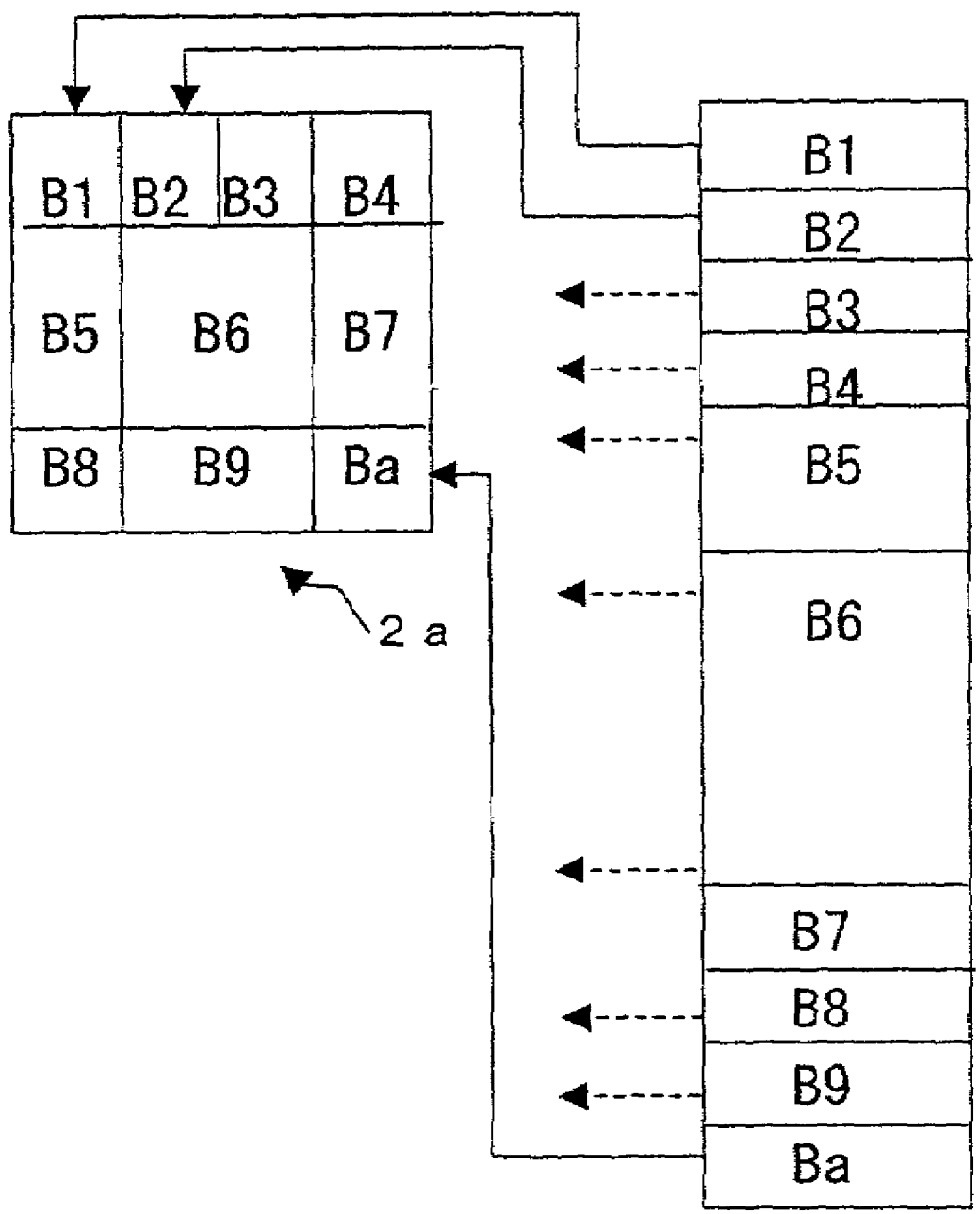
FIG. 16 is a diagram showing an example of a variation of the memory map of the insert area.

An embodiment of an image processing system according to the present invention will hereinafter be described with reference to FIGS. 1 through 17. FIG. 1 is a view showing an external configuration of the image processing system in this embodiment. FIG. 2 is a block diagram showing a hardware architecture of this image processing system. FIG. 3 is a view showing a principle of an image insert process. FIG. 4 is a diagram showing a memory map of an insert area 2 shown in FIG. 3. FIG. 5 is a view showing a typical image insert process. FIG. 6 is a view showing a consecutive image insert process. FIG. 7 is a diagram showing a data structure for an image data management. FIG. 8 is a view showing how the inserted image is transferred. FIG. 9 is a view how the inserted image is deleted. FIG. 10 is a view showing how the inserted image is stored. FIG. 11 is a flowchart showing the insert process. FIG. 12 is a flowchart showing an inserted image transferring/deleting process. FIG. 13 is a flowchart showing an inserted image storing process. FIG. 14 is a flowchart showing an environment setting process. FIG. 15 is a view showing an example of a variation of the insert area. FIG. 16 is a diagram showing an example of a variation of the memory map of the insert area. FIG. 17 is a chart showing an insert area management table for managing the insert area.

<Architecture>

FIG. 1 is a view showing an external configuration of an image processing system 200 in this embodiment. The image processing system 200 is connected via a universal serial bus (which will hereinafter abbreviated to USB) cable 300 to an image acquisition device 101.

The image processing system 200 is constructed to function in such a way that a predetermined control program is executed by a portable terminal.

The image acquisition device 101 includes a button 102, provided on a front surface of a device body 100, for indicating an execution of an image taking process, and a lens 103 for forming an image inside the device body 100. Further, the image acquisition device 101 has an unillustrated CCD imaging device incorporated into the device body 100.

FIG. 2 is the block diagram showing the hardware architecture of the image processing system 200. As shown in FIG. 2, the image processing system 200 includes a CPU 201 for obtaining digital image signals generated by the image acquisition device 101 and controlling the image process, and a memory 202 for storing the control program executed by the CPU 201 and data processed by the CPU 201. The image processing system 200 further includes a touch panel 203 for detecting an operation by a user, a hard disk 204 for recording the data, and a keyboard 206.

The CPU 201 controls photographing by executing the control program stored in the memory 202. The CPU 201 normally monitors a photographing instruction by the user or an image operation on the touch panel 203.

The CPU 201, when detecting the user's photographing instruction, stores a hard disk 204 with the image data obtained by the image acquisition device 101.

Further, the CPU 201, when detecting the user's image operation, i.e., drag-and-drop etc of the image on the touch panel 203, executes a process corresponding to this operation. The drag-and-drop herein connotes an operation that an operation target displayed on the screen, which is pinpointed by a depression on the touch panel 203 or by depressing a mouse button of a mouse, is moved (drag) in this as-depressed state to a desired position, and then this depression is released (drop).

The memory 202 stores the control program executed by the CPU 201 and the image data processed by the CPU 201.

The touch panel 203 is constructed of a combination of a liquid crystal display and a sensor for detecting a position of the depressing operation of the user. Icons and image data, which are manipulated by the user, are displayed on the touch panel 203. The CPU 201 detects the user's manipulations with respect to the icons and the image data through the touch panel 203.

What is well known as the sensor of this type of touch panel 203 may be a pressure sensitive type sensor, an electrostatic type sensor and an ultrasonic type sensor.

The device for detecting the manipulating position by the user is not, however, limited to this touch panel in terms of actualizing the present invention, and, as a matter of course, other devices such as a mouse, a keyboard etc are usable (the device such as the touch panel 203, the mouse, the keyboard etc corresponds to a transfer detecting unit.).

The hard disk 204 stores the data of the image data of a photographed object and the image data processed by the CPU 201.

<Outline of Insert Operation>

The image processing system 200 in this embodiment executes the image insert process as a characteristic function thereof.

FIG. 3 is the explanatory view showing the principle of the image insert process. The image insert process is a process of inserting and displaying an image specified by the user into and on an insert area 2 in scale-down or in scale-up or in equal size.

The insert area 2 (corresponding to a composite area) is configured by combining a plurality of blocks 1 in a tile-like shape. The user may specify an arbitrary color as a background color of the insert area 2 among colors prepared in the image processing system 200. Further, the user may specify dimensions of the insert area 2.

The block(s) (corresponding to a unit area(s)) indicates a position and dimensions in which the image is inserted. The user may set arbitrary values for defining the dimensions of the block(s). The user may also specify an arbitrary value for setting the number of blocks within the insert area 2. Referring to FIG. 3, the block 1 is framed in bold at a right upper corner of the insert area 2.

In the insert process, the user specifies, by the drag and drop, an insert target original image 3 and a block 4 into which the image is inserted. With this operation, at first the original image is copied. Next, the copied image is displayed in the insert destination block 4 in scale-up or in scale-down or in equal size corresponding to the dimensions of this block 4.

Referring again to FIG. 3, the drag-and-drop (which will hereinafter be called an insert operation) is represented by use of an arrow line A. With this insert operation, the original image 3 is inserted into the insert destination block 4. The user may specify any blocks within the insert area 2 to define a position of this insert destination block. Further, if the user executes the insert operation outside the insert area 2, this operation is ruled out, with the result that the original image 3 is inserted into none of those blocks 1 within the insert area 2.

On the other hand, the user is able to transfer an inserted image 4 to a desired block by dragging and dropping (as indicated by an arrow line B) the inserted image in the insert area 2. Further, the user is able to delete the inserted image 4 out of the insert area 2 by dragging and dropping (as indicated by an arrow line C) the inserted image outside the insert area 2.

FIG. 4 shows the memory map for retaining the respective inserted image displayed in the insert area 2. Blocks B1 through B9 configure the insert area 2. Image memory areas 40 (corresponding to a plurality of unit storage areas) corresponding to those blocks B1-B9 are ensured on the memory 202. With the insert operation described above, data of the inserted image is stored in the image memory area 40.

The data in the image memory areas 40 is displayed directly as the inserted image on the touch panel 203. Further, the image data in the image memory area 40 is transferred or deleted or stored in the hard disk 204 by the above operation such as transferring, deleting and storing. These processes are executed under the control of the CPU 201. The CPU 201 corresponds to a control unit controlling an access to the unit storage area.

<Layout on Screen>

FIG. 5 shows a screen for showing the insert operations on the touch panel 203 (which corresponds to a display unit displaying the composite area on the screen). The touch panel 203 includes the insert area 2, a photographing button icon 22, a photographed image display frame module 23, a photographing mode menu 24, and an environment setting menu 26.

The photographing button icon 22 serves to detect a user's photograph instruction through the touch panel 203. The user specifies the photograph by depressing any one of the photographing button icon 22 or the button provided on the image acquisition device 101.

The photographed image display frame module 23 includes film frames that simulate a configuration of a film as a whole, an image display area consisting of three pieces of film frames, and a scroll button icon for scrolling the 3-frame image display area. The photographed image data are displayed on the 3-frame image display area.

The photographing mode menu 24 is used for switching over a photographing mode to a normal photographing mode and a consecutive photographing mode.

The environment setting menu 26 serves to set an environment of this image photographing system, such as a consecutive photographing interval, a background color of the insert area 2 etc.

<Normal Insert Operation>

FIG. 5 further shows a transition of the screen when executing a normal insert operation. The normal insert operation is an operation of inserting one piece of original image displayed in the photographed image display frame module 23 into one block in the insert area 2.

Referring to FIG. 5, an arrow line D represents the drag-and-drop implemented by the user. An image 23*b* existing at a start point of the arrow line D is an insert target original image. The image 23*b* is selected as a drag-and-drop target and is therefore framed 31 in bold. Further, a block 21*b* positioned at an end point of the arrow line D is an insert destination block. With this drag-and-drop, the image 23*b* is inserted into the block 21*b*.

Note that if a position outside the insert area 2 is specified as an insert destination, this insert operation is ruled out.

<Consecutive Insert Operation>

FIG. 6 shows a transition of the screen when executing a consecutive insert operation. The consecutive insert operation is a process of consecutively inserting a set of plural images by one insert operation (CPU 201 which provides the function corresponds to a related image indicating module).

This set of images consist of a plurality of images photographed in the consecutive photographing mode. If the mage positioned at a head of this set of images is specified as an insert target, this whole set of images becomes the insert target.

Referring to FIG. 6, an arrow line E represents a user's drag-and-drop. An image 23*c* existing at a start point of the arrow line E is an insert target original image specified by the user. The image 23*c* is selected as a drag-and-drop target and is therefore framed 31 in bold.

Further, a block 21*c* positioned at an end point of the arrow line E is an insert destination block. An arrow line F, of which a start point exists in the block 21*c*, indicates a transition direction of a consecutive insert target block.

Thus, according to the consecutive insert operation in the present image processing system 200, the images are inserted consecutively into the blocks disposed in the right direction from the insert destination block 21*c*. Further, when the insert destination reaches the block 21*d* disposed at a right end of the insert area 2 midways of the consecutive insert operation, the insert destination moves round down to a block 21*e* disposed at a left end of a next lower row. Then, the insert operation continues as an arrow line G indicates. Namely, the consecutive insert operation proceeds in a right downward direction with a priority given to the blocks disposed in the horizontal direction.

Further, when the insert position arrives at a block 21*f* disposed at a right lower corner of the insert area 2 during the consecutive insert operation, this consecutive insert operation comes to an end. Therefore, remaining images among the plurality of consecutive insert target images photographed in the consecutive photographing mode, are ruled out of the insert targets.

On the other hand, all the images contained in the above set of images are inserted before the insert position arrives at the block 21f disposed at a right lower corner of the insert area 2, the insert operation is finished at this point of time.

FIG. 7 shows a data structure for managing the insert target image data in the present image processing system 200. This data structure is generally known as a list structure. In the list structure, a plurality of elements are linked by next addresses 54a, 54b, 54c etc, and a sequence relation between the elements is thus expressed. In this list structure, a next address 54g is NULL. This element is a tail element of the list structure. Further, the tail element is indicated by a list terminal address 51.

On the other hand, the elements corresponding to the image data displayed in the photographed image display frame module 23 on the touch panel 203, are indicated by an intra-screen head address 52 and an intra-screen terminal address 53.

Each element in this data structure retains a file name, a date, a consecutive photographing attribute 55 in addition to the next address 54 etc. Herein, the file name is a name of a file in which the image data are stored. This file is created on the hard disk 204. The date is a photographing date when the image data are created.

Further, the consecutive photographing attribute 55 indicates that the image concerned is consecutively photographed. The consecutive photographing attribute 55 has three categories such as a start of the consecutive photographing, an on-consecutive-photographing state, and an end of the consecutive photographing.

The start of the consecutive photographing indicates that the image concerned is a start image of the consecutive photographing. Further, the end of the consecutive photographing indicates that the image concerned is an end image of the consecutive photographing. The on-consecutive-photographing state is set as consecutive photographing attribute 55 in a position interposed between the start of the consecutive photographing and the end of the consecutive photographing. These elements form the set of consecutive insert target images.

When the image exhibiting the start-of-consecutive-photographing attribute is specified as an insert target, the whole set of images containing this image become the insert target.

<Transfer of Inserted Image>

FIG. 8 shows a transition of the screen when transferring the inserted image. The transfer of the inserted image is an operation of transferring the inserted image to an arbitrary block within the insert area 2.

Referring to FIG. 8, an arrow line H indicates the drag-and-drop by the user. The inserted image in a block 21g disposed at a start of this arrow line H is defined as a transfer target image. The inserted image in the block 21g is selected as a drag-and-drop target image, and is therefore depicted by a dotted line. Further, a block 21h positioned at an end of the arrow line H is a transfer destination block.

With this operation, the before-transfer inserted image in the block 21g is transferred to the block 21h.

<Deletion of Inserted Image>

FIG. 9 shows a transition of the screen when deleting the inserted image. The deletion of the inserted image is an operation to make images disappear from the insert area 2.

Referring to FIG. 9, an arrow line I indicates the drag-and-drop by the user. The inserted image in a block 21i disposed at a start of this arrow line I is defined as a delete target image. The inserted image in the block 21i is selected as a drag-and-drop target image, and is therefore depicted by a dotted line. In this delete process of the inserted image, a drop point (the end point of the arrow line I) must be positioned outside the insert area 2.

With this operation, the inserted image in the block 21i is deleted. Note that even when deleting the inserted image as described above, the original image 23b of the inserted image is not deleted (the original image 23b is indicated by an arrow line K in FIG. 9).

<Storage of Inserted Image>

FIG. 10 shows a transition of the screen when storing the inserted image. The storage of the inserted image is a process of synthesizing the plurality of inserted images in the insert area 2 into one image, and storing this synthesized image.

The storage of the inserted image is executed upon depressing the photographing button icon 22 in a state where the images are inserted in the insert area 2. With this process, the plurality of inserted images in the insert area 2 are synthesized into one single image 23c and managed in the same way as other images obtained by the photographing process.

<Function and Effect>

FIGS. 11 through 14 show the processes of the control program executed by the CPU 201 (the touch panel 203 and the CPU 201 for executing the control program, correspond to an operation unit.). The CPU 201 executes the control program, thereby providing a function as the image processing system 200.

FIG. 11 is a flowchart showing the insert process. In this process, to start with, the CPU 201 reads the number of blocks, lengthwise and crosswise dimensions of the block, a background color of the insert area 2 from the hard disk 204 (S31). The number of blocks, the lengthwise and crosswise dimensions of the block, the background color of the insert area 2, are set by the user through the environment setting menu 26, and stored on the hard disk 204.

Next, the CPU 201 calculates lengthwise and crosswise dimensions of the insert area 2 on the basis of the number of blocks and the block dimensions (S32). Further, the image memory areas 40 (shown in FIG. 4) for storing the data of the insert area 2, are ensured.

Next, the CPU 201 develops the before-insertion original image on the memory (S33). This original image is displayed in the photographed image display frame module 23.

Subsequently, the CPU 201 detects that the user drags and drops the original image (S34). Next, the CPU 201 judges whether or not the original image is dropped in the insert area 2 (S35). If nor dropped in the insert area 2 (No judgement in S35), the CPU 201 finishes the processing.

Whereas if dropped in the insert area 2, the CPU 201 detects the number of the insert targets (S36). The number of insert targets is "1" in the case of the images photographed in the normal photographing mode. By contrast, the number of the insert targets is the number of consecutively photographed images in the consecutive photographing mode.

Next, the CPU 201 calculates a position of the block into which the image should be inserted next within the insert area 2 (S37). Subsequently, the CPU 201 judges whether or not this block position is within the insert area 2 (exceeds the block 21f disposed at the right lower corner as shown in FIG. 6) (S38) If the block position is not within the insert area 2 (No judgement in S38), the CPU 201 finishes the processing.

Whereas if the block position is within the insert area 2 (Yes judgement in S38), the CPU 201 modifies the original image so as to adapt itself to the block dimensions (S39). Further, the CPU 201 copies this image to the relevant block position, and displays it on the screen.

Next, the CPU 201 decrements the number of the insert targets by "1" (S3a). Subsequently, the CPU 201 judges whether or not there is remaining insert target (S3b). If the insert target is left, the CPU 201 returns the control to the process in S37 (Yes judgement in S3b). Whereas if no insert target is left, the CPU 201 finishes the processing.

FIG. 12 shows the transferring/deleting process of the inserted image. In the transferring/deleting process of the inserted image, the CPU 201 at first detects which insert image to be transferred is selected in the insert area 2 (S51).

Next, the CPU 201 detects whether or not the inserted image is dragged and dropped to a transfer destination (S52).

Subsequently, the CPU 201 judges whether or not the transfer destination is within the insert area 2 (S53). If the transfer destination is within the insert area 2, the CPU 201 detects a position of this transfer destination block (S54). Further, the CPU 201 transfers the inserted image to that position (S55). Thereafter, the CPU 201 finishes the processing.

On the other hand, if the transfer destination exists outside the insert area 2 (No judgement in S53), the CPU 201 deletes the transfer originating inserted image (S56). Thereafter, the CPU 201 terminates the processing.

FIG. 13 shows the inserted image storing process. The inserted image storing process is executed upon detecting a depression on the photographing button icon 22 when the image is being inserted in the insert area 2.

In the inserted image storing process, the CPU 201, to begin with, synthesizes the inserted images embraced in the insert area 2 into a 1-frame image (S71). Further, the CPU 201 scales down this synthesized image to a size of one frame in the photographed image display frame module 23.

Next, the CPU 201 displays this scaled-down image in the photographed image display frame module 23 (S72).

Subsequently, the CPU 201 stores the hard disk 204 with the image obtained by synthesization in a predetermined size (S73). Thereafter, the CPU 201 finishes the processing.

Note that the size of the image stored on this hard disk 204 is previously defined by the number of blocks (the number of divisions) in the insert area 2.

For example, when the insert area 2 is divided lengthwise and crosswise by 4, i.e., 2×2, the size of the inserted image to be stored is defined lengthwise and crosswise by 320 dots×240 dots. When the insert area 2 is divided lengthwise and crosswise by 9, i.e., 3×3, the size of the inserted image to be stored is defined lengthwise and crosswise by 480 dots×360 dots.

Based on this item of definition data, the image set to a size corresponding to the number of blocks (the number of divisions) set when in the insert process, is stored on the hard disk 204.

Furthermore, the image thus stored on the hard disk 204 is managed as one element of the data structure in FIG. 7 by the same processing with an image newly obtained in the photographing process.

FIG. 14 shows the environment setting process. The environment setting process is executed upon detecting a depression on the environment setting menu 26 on the touch panel 203.

In the environment setting process, to start with, the CPU 201 displays an unillustrated menu screen (S91).

Next, the CPU 201 waits a user's operation (S92). The user may set the consecutive photographing interval, the background color, the block size in the insert area 2 and the number of blocks therein.

Subsequently, the CPU 201 judges whether or not set conditions are stored (S93). Whether the set conditions are stored or not is determined based on whether or not a storage button icon on the unillustrated menu screen is depressed.

In the case of storing these set conditions, the CPU 201 stores the set conditions in the hard disk 204 (S94). Whereas if not stored, the CPU 201 comes directly to an end of the processing.

The image processing system 200 in this embodiment has the display screen including the blocks into which the images are inserted, and the insert area 2 defined as an aggregation of the blocks, wherein the images are inserted into the blocks within the insert area 2, thus forming the composite images. The user is therefore able to easily obtain the composite images.

Accordingly, there is no necessity for a process of searching a displayed area and a non-displayed area when in the imaging process, and even a system having a low throughput is capable of creating the image with a less load.

According to the image processing system 200 in this embodiment, the insert process, the transfer of the inserted image to the block within the insert area 2, and the deletion and storage of the inserted image, can be attained by the drag-and-drop. Accordingly, the user is able to insert the image arbitrarily and easily.

The image processing system 200 in this embodiment manages the images photographed in the consecutive photographing mode as a set of images. In the case of inserting this set of images into the blocks, the consecutive insert process is executed. Accordingly, the user can easily insert the multiplicity of images. Moreover, if the number of the inserted images exceeds the number of the blocks into which the images can be inserted (i.e., if beyond the position of the block at the right lower corner of the insert area), the insert process comes to an end. The user is therefore able to execute the insertion without being aware of the number of remaining blocks in the insert area.

The image processing system 200 in this embodiment synthesizes the images in the insert area 2 into the 1-frame image and thus stores the synthesized image. As a result, the data of the multiplicity of images are combined into the small-capacity image data. It is therefore feasible to decrease the data capacity when distributing through the units for storing, managing and communicating the image data.

<Modified Example of Hardware Architecture>

The embodiment discussed above has dealt with the image processing system 200 constructed by incorporating the control program into the portable terminal. The embodiment of the present invention is not, however, limited to this architecture. The present invention can be embodied in, for example, a personal computer and a workstation, or in a television etc including the memory for storing the image data and the CPU for executing the control program.

<Modified Example of Original Image Generating Method>

The image processing system 200 in the embodiment discussed above executes the insert process of the image data generated by the image acquisition device 101. According to the present invention, however, the insert target image is not confined to the image generated by the image acquisition device 101. For instance, the image processing system 200 is provided with a memory card interface, and the data of the image photographed by other digital camera etc may be read and set as an insert target. Further, the image processing system 200 may also be provided with a MODEM or a LAN interface. Then, the images created by other computers etc are received and may also be set as insert targets.

Moreover, the image data generated by other processes (other application program) in the image processing system 200 may also be set insert targets.

<Modified Example of Specifying Consecutive Insert Process>

In the embodiment discussed above, the consecutive insert process is executed when the head image in the set of plural images photographed in the consecutive photographing mode is specified as the insert target. The embodiment of the present embodiment is not, however, restricted to this insert method. For example, when an image other than the head image in the set of images is specified as an insert target, all the images contained in the set of images may be consecutively inserted.

Further, when the image other than the head image in the set of images is specified as the insert target, the images inclusive of the image specified as the insert target may be consecutively inserted.

Further, the set of images are not limited to the set of plural images photographed in the consecutive photographing mode. For instance, there may be provided a photographing mode in which a set of images may be composed of images obtained by the normal photographing. Moreover, the image processing system 200 may incorporate a combination specifying function for combining the plurality of images. This function may be attained in such a way that a desired image is specified, for example, by depression-pinpointing this image while scrolling the images in the photographed image display frame module 23 on the touch panel 203 shown in FIG. 5. The CPU 201, when the image in the photographed image display frame module 23 is depression-pinpointed during an execution of the combination specifying function, may define a set of images by recognizing the image data from coordinates thereof.

<Modified Examples of Insert Area and Block>

The embodiment discussed above has dealt with the image processing system 200 including the insert area composed of the blocks each having the same dimensions. The embodiment of the present invention is not, however, limited to this construction. For instance, an insert area 2a may be composed of the blocks having different dimensions as shown in FIG. 15.

In this case, as shown in FIG. 16, the insertion, transfer, deletion and storage can be executed in the same manner as the embodiment discussed above by ensuring the image memory areas 40 having capacities different per block. If the image inserted into the block having comparatively small dimensions is transferred to a block having comparatively large dimensions, a data quantity decreases, with the result that the image quality declines. In this case, an image adapted to the specified block dimension may be created from the original image, and reinserted.

Thus, what is needed when using the blocks having the different dimensions in the insert area 2, is a module for managing the coordinates for indicating a position of each block and the dimensions for indicating a size thereof. Another requirement is to provide a module for managing addresses in the image memory areas 40 for storing the image data in the respective blocks.

FIG. 17 shows a structure of an insert area management table provided for those usage. This table contains a block number for identifying each block, an image memory area head address, a terminal address, and coordinates for indicating a left lower corner and a right upper corner of the block.

An area of this table has a variable length corresponding to the number of blocks that is specified in the environment setting menu 26. Accordingly, the CPU 201 ensures a necessary area on the memory 202 corresponding to the number of blocks.

Further, the CPU 201 detects and sets the respective coordinates of the left lower corner and the right upper corner of the block on the basis of the positions and dimensions of the respective blocks which are specified when setting the environment.

Moreover, the CPU 201, based on the size of each of the blocks, determines a required capacity of the image memory areas 40, and sets the image memory area head address and terminal address for every block.

When inserting the image, the CPU 201 obtains the position of each block on the basis of contents of this insert area management table. Further, the CPU 201 obtains a size of the block from the coordinates of the left lower corner and the right upper corner of the block, and scales up or down the original image. Moreover, the CPU 201 stores the image data thereof in the image memory area 40 corresponding to the insert destination block.

Note that the insert area management table may be stored beforehand with the sizes of the respective blocks instead of obtaining the size of the block from the coordinates of the left lower corner and the right upper corner of the block.

This insert area 2a being thus structured, the user becomes capable of separately using the blocks such as inserting an important image into a large block and an unimportant image into a small block.

<Modified Example of Consecutive Insert Direction>

According to the image processing system 200 in the embodiment discussed above, when executing the consecutive insert process, the image insertion proceeds, from the block in the insert start position, in the right downward direction with the priority given to the blocks disposed in the horizontal direction. The embodiment of the present invention is not, however, restricted to this consecutive insert direction. That is, the consecutive insertions may proceed in any directions, whether upwards and downwards, or rightwards and leftwards. Further, the images may also be inserted at random by creating random numbers.

<Readable-by-Computer Recording Medium>

The control program in this embodiment may be recorded on a readable-by-computer recording medium. Then, a computer reads the control program on this recording medium, and executes this program, whereby the computer functions as the image processing system 200 demonstrated in this embodiment.

Herein, the readable-by-computer recording medium embraces recording mediums capable of storing information such as data, programs, etc electrically, magnetically, optically and mechanically or by chemical action, which can be all read by the computer. What is demountable out of the computer among those recording mediums may be, e.g., a floppy disk, a magneto-optic disk, a CD-ROM, a CD-R/W, a DVD, a DAT, an 8 mm tape, a memory card, etc.

Further, a hard disk, a ROM (Read Only Memory) and so on are classified as fixed type recording mediums within the computer.

<Data Communication Signal Embodied in Carrier Wave>

Furthermore, the control program described above may be stored in the hard disk and the memory of the computer, and downloaded to other computers via communication media. In this case, the program is transmitted as data communication signals embodied in carrier waves via the communication media. Then, the computer downloaded with this program can be made to function as the image processing system 200 in this embodiment.

Herein, the communication media may be classified into cable communication mediums (such as metallic cables including a coaxial cable and a twisted pair cable, or an optical communication cable), and wireless communication media (such as satellite communications, ground wave wireless communications, etc.).

Further, the carrier waves are electromagnetic waves or light beams for modulating the data communication signals. The carrier waves may, however, be DC signals (in this case, the data communication signals take a base band waveform with no carrier wave). Accordingly, the data communication signal embodied in the carrier wave maybe any one of a modulated broad band signal and a non-modulated base band signal (which corresponds to a case of setting a DC signal having a voltage of 0 as a carrier wave).

What is claimed is:

1. An image processing apparatus, comprising:
   at least one processing target unit image;
   a plurality of vacant unit storage areas arranged in a matrix to have images selectively inserted; and
   a control unit controlling an access to each of the unit storage areas,
   wherein the control unit stores the at least one processing target unit image in at least one of the plurality of vacant unit storage areas in accordance with a selected insertion of the at least one processing target unit image, accesses the unit storage areas in a predetermined sequence, and thereby generates a composite image from the unit images.

2. The image processing apparatus according to claim 1, further comprising:
   unit storage areas having different capacities,
   wherein the composite image is composed of the unit images having different dimensions.

3. A storage medium readable by a machine, tangibly embodying a program of instructions executable by the machine to perform operations, comprising:
   displaying a composite area on a display of the machine as an aggregation of vacant unit areas arranged in a matrix into which images are insertable; and
   selectively inserting processing target images into selected ones of the vacant unit areas within the composite area.

4. A storage medium readable by a machine, tangibly embodying a program of instructions executable by the machine to perform operations, comprising:
   displaying a composite area as an aggregation of vacant unit areas arranged in a matrix into which images are insertable;
   detecting an indication of a processing target image;
   detecting a transfer of the indicated image; and
   selectively inserting the indicated image into one of the vacant unit areas.

5. An image processing apparatus, comprising:
   a controlling unit for dividing a portion of a display into a predetermined composite area, wherein the composite area includes a plurality of vacant blocks arranged in a matrix and each of the plurality of blocks may have a processing target image inserted from a source or any of the plurality of blocks may be left vacant;
   an operation unit aggregating the matrix of the plurality of blocks, whether filled with an image or vacant into a combined image.

6. An image processing apparatus according to claim 5, wherein the image inserted into the block is transferable to other blocks within the composite area.

7. An image processing apparatus according to claim 5, wherein the image inserted into the block is deleted by transferring the same image to a position outside the composite area.

8. An image processing apparatus according to claim 5, wherein the processing target image is inserted into the block by a drag-and-drop operation.

9. An image processing apparatus according to claim 5, further comprising:
   a transfer detection unit indicating a processing target image and detecting a transfer of the indicated image,
   wherein the indicated image is inserted into the block.

10. An image processing apparatus according to claim 5, wherein the composite area into which the images are inserted is stored as an image having predetermined dimensions.

11. An image processing apparatus according to claim 5, further comprising:
    a related image indicating module relating a plurality of target images to each other,
    wherein when a first target image is related to other images, the related images are consecutively inserted together as a group with the first target image into the plurality of blocks.

12. An image processing apparatus according to claim 11, wherein when the number of images to be inserted exceeds the number of insertable vacant blocks, the image insertion is finished.

13. An image processing apparatus according to claim 5, wherein the composite area is composed of blocks having different dimensions.

14. An image processing apparatus according to claim 5, wherein dimensions of the blocks are specified irrespective of dimensions of the processing target image, and
    the processing target image is adjusted to the dimensions of the block that accepts the inserted image.

15. An image processing apparatus according to claim 5, wherein the number of the blocks within the composite area can be arbitrarily set.

16. An image processing apparatus according to claim 5, wherein a background color of the blocks can be arbitrarily set.

17. An image processing apparatus according to claim 5, wherein a configuration of the blocks is a rectangular shape of which dimensions can be arbitrarily set.

18. An image processing apparatus according to claim 7, wherein even when the image inserted into the block is deleted, an original image of the image inset in the block is not deleted.

19. An image processing apparatus according to claim 5, wherein dimensions of the composite area can be arbitrarily set.

20. An image processing apparatus according to claim 11, wherein the plurality of target images are consecutively inserted into the plurality of blocks starting from an arbitrarily specified block within the composite area matrix.

* * * * *